US009756342B2

(12) United States Patent
Cordara

(10) Patent No.: US 9,756,342 B2
(45) Date of Patent: Sep. 5, 2017

(54) METHOD FOR CONTEXT BASED ENCODING OF A HISTOGRAM MAP OF AN IMAGE

(71) Applicant: Huawei Technologies Co., Ltd., Shenzhen (CN)

(72) Inventor: Giovanni Cordara, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 14/766,737

(22) PCT Filed: Jan. 16, 2013

(86) PCT No.: PCT/EP2013/050700
§ 371 (c)(1),
(2) Date: Aug. 7, 2015

(87) PCT Pub. No.: WO2014/111136
PCT Pub. Date: Jul. 24, 2014

(65) Prior Publication Data
US 2016/0044319 A1 Feb. 11, 2016

(51) Int. Cl.
*H04N 19/167* (2014.01)
*G06K 9/46* (2006.01)
(Continued)

(52) U.S. Cl.
CPC ......... *H04N 19/167* (2014.11); *G06K 9/4642* (2013.01); *G06K 9/4671* (2013.01);
(Continued)

(58) Field of Classification Search
CPC ..... H04N 19/176; H04N 19/13; H04N 19/463
(Continued)

(56) References Cited

U.S. PATENT DOCUMENTS

2013/0039566 A1    2/2013  Reznick et al.

FOREIGN PATENT DOCUMENTS

KR    20140045585 A    4/2014
WO    WO 2013102503 A1    7/2013
(Continued)

OTHER PUBLICATIONS

Lowe et al., "Distinctive Image Feature from Scale-Invariant Keypoints," International Journal of Computer Vision, pp. 1-28 (Jan. 5, 2004).
(Continued)

*Primary Examiner* — Nguyen Truong
(74) *Attorney, Agent, or Firm* — Leydig, Voit & Mayer, Ltd.

(57) ABSTRACT

The invention relates to a method (100) for context based encoding of a histogram map of an image, the histogram map representing location information of key points of the image, the method comprising: providing (101) compressed context representation information (A; B; C) associated to a given encoding size and to a given block size of a spatial grid applied to a matrix representation of the image to obtain the histogram map; computing (103), from the compressed context representation information (A; B; C), a context (201) for the given encoding size and the given block size by applying an approximation algorithm; and encoding (105) the histogram map using the context computed for the given encoding size and the given block size.

11 Claims, 8 Drawing Sheets

(51) Int. Cl.
G06T 9/00 (2006.01)
H04N 19/176 (2014.01)
H04N 19/463 (2014.01)
H04N 19/146 (2014.01)
G06K 9/72 (2006.01)
H04N 19/136 (2014.01)
G06K 9/52 (2006.01)
G06T 7/60 (2017.01)
H04N 19/13 (2014.01)

(52) U.S. Cl.
CPC ............... G06K 9/52 (2013.01); G06K 9/72 (2013.01); G06T 7/60 (2013.01); G06T 9/001 (2013.01); G06T 9/005 (2013.01); H04N 19/136 (2014.11); H04N 19/146 (2014.11); H04N 19/176 (2014.11); H04N 19/463 (2014.11); H04N 19/13 (2014.11)

(58) Field of Classification Search
USPC .................................................. 375/240.08
See application file for complete search history.

(56) References Cited

FOREIGN PATENT DOCUMENTS

WO  WO 2013160210 A1  10/2013
WO  WO 2014009198 A1  1/2014

OTHER PUBLICATIONS

Bay et al, "SURF: Speeded Up Robust Features," Computer Vision and Image Understanding, vol. 110, Issue 3, pp. 346-359 (Jun. 2008).

Tsai et al., "Improvements to Location Coding: Response to Core Experiment 3- Feature Point Location Coding," International Organisation for Standardisation; Coding of Moving Pictures and Audio, ISO/IEC JTC1/SC29/WG11, MPEG2012/M24758, Geneva, Switzerland (Apr. 2012).

Karczewicz et al., "Table removal in contexts assignment of last significant position (LAST) coding," Joint Collaborative Team on Video Coding (JCT-VC) of ITU-T SG16 WP3 and ISO/IEC JTC1/SC29/WG11, 9th Meeting: Geneva, Switzerland, Document JCTVC-I0331 (Apr. 27-May 7, 2012).

Tsai et al., "Location Coding for Mobile Image Retrieval," Proceedings of the 5th International ICST Mobile Multimedia Communications Conference, Article No. 8, Institute for Computer Sciences, Social-Informatics and Telecommunications Engineering, Brussels, Belgium (Sep. 7, 2009).

Cordara et al., "CDVS Core Experiment 3 related: reduction of context tables," International Organisation for Standardisation; Coding of Moving Pictures and Audio, ISO/IEC JTC1/SC29/WG11, MPEG2013/M28131, Geneva, Switzerland (Jan. 2013).

Bober et al., Test Model 4: Compact Descriptors for Visual Search, International Organisation for Standardisation; Coding of Moving Pictures and Audio, ISO/IEC JTC1/SC29/WG11/W13145, Shanghai, China (Oct. 2012).

"Information Technology—Multimedia content description interface—Part 13: Compact descriptors for visual search," Final Draft International Standard, ISO/IEC FDIS 15938-13, ISO/IEC JTC 1/SC 29, pp. i-132 (Oct. 24, 2014).

KR-10-2015-7021832, Office Action, dated Jan. 20, 2017.

Tsai et al., "Improved Coding for Image Feature Location Information," SPIE Optical Engineering+ Applications, International Society for Optics and Photonics (2012).

METHOD FOR CONTEXT BASED ENCODING OF A HISTOGRAM MAP OF AN IMAGE

CROSS REFERENCE

This application is a National Stage of International Patent Application No. PCT/EP2013/050700, filed Jan. 16, 2013, which is hereby incorporated by reference in its entirety.

TECHNICAL FIELD

The present invention relates to a method for encoding a map of location information determined from coordinates of a set of key points of an image and to an encoder for encoding such a map of location information.

The present invention particularly relates to the field of Computer Vision and Visual Search or Augmented Reality. In Visual Search and Augmented Reality applications, information extracted from an image or a sequence of images is sent to a server, where it is compared against information extracted from a database of reference images representing models of objects to be recognized. In this context, the present invention relates to a compression of information extracted from an image or a sequence of images which are sent to a server, in particular a compression of information needed to signal the position of points of interest extracted from the image or the sequence of the images.

BACKGROUND OF THE INVENTION

Visual Search (VS) is referred to as a capability of an automated system to identify an object or objects depicted in an image or in a sequence of images by only analyzing the visual aspects of the image or the sequence of images, without exploiting any external data, such as textual description, metadata, etc. Augmented Reality (AR) can be considered an advanced usage of VS. After objects depicted in an image or in an sequence of images have been identified, additional content (e.g. synthetic objects) is superimposed to the real scene represented by the image or the sequence of the images, thus 'augmenting' the real content; the position of the additional content is consistent to the one of the real objects.

The predominant method of VS relies on determining so called local features which are referred to as descriptors in literature and also hereinafter. The most famous methods are Scale-Invariant Feature Transforms (SIFT) as described by D. Lowe in "Distinctive Image Features from Scale-Invariant Keypoints, Int. Journal of Computer Vision 60 (2) (2004) 91-110. H" and Speeded Up Robust Features (SURF) as described by Bay, T. Tuytelaars, L. V. Gool in "SURF: Speeded Up Robust Features, in: Proceedings of European Conference on Computer Vision (ECCV), Graz, Austria, 2006, http://www.vision.ee.ethz.ch/~surf/". In literature it is possible to find many variations of those technologies, which can be considered improvements of those two original technologies.

As can be seen from FIG. 7, a local feature is a compact description, e.g. 128 Bytes for each local feature in SIFT, of a patch 703 surrounding a key point 705 in an image 701. FIG. 7 shows an example of extraction (upper part of FIG. 7) and representation (lower part of FIG. 7) of local features. In the upper part of FIG. 7 the position of the point where the local feature is computed is indicated by a circle representing the point 705 in the image 701, the circle being surrounded by a square representing the oriented patch 703. In the lower part of FIG. 7 a grid 709 subdivision of the patch 703 contains histogram components 711 of the local feature. In order to compute a local feature, a main orientation 707 of the point 705 is computed based on the main gradient component in the point's 705 surrounding. Starting from this orientation 707, a patch 703 oriented towards the main orientation 707 is extracted. This patch 703 is then subdivided into a rectangular or radial grid 709. For each element of the grid 709, a histogram 711 of the local gradients is computed. The histograms 711 computed for the grid 709 elements represent the components of the local feature. Characteristic of such descriptor 713 containing the histograms 711 of the grid 709 elements as illustrated in the lower part of FIG. 7 is to be invariant to rotation, illumination, and perspective distortions.

In an image 701, the points 705 upon which local features 713 are computed identify distinct elements of the scene, e.g. corners, specific patterns, etc. Such points are normally called key points 705, also referred to as points of interest 705. The circles depicted in the upper part of FIG. 7 show exemplary key points 705. The x/y position in the image of the key points 705 will be referred hereinafter as location information of the local feature.

MPEG is currently defining a new part of MPEG-7 (ISO/IEC 15938-Multimedia content description interface), part 13, Compact Descriptors for Visual Search (CDVS) dedicated to the development of a standard for Visual Search. The standard aims at defining a normative way to compress the amount of information enabling Visual Search, in order to minimize network delay and overall bitrate. In particular, the technology being standardized encompasses a compression mechanism for two kinds of information related to individual key points 705, hereinafter referred as feature information, on one hand the content information, i.e. the local feature or descriptor providing a compact descriptor of the patch 703 surrounding the key point 705, and on the other hand the location information, i.e. the position of the key point 705.

In the CDVS standardization process, six operating points have been defined for testing purposes. The operating points which are hereinafter referred to as bitrate have the following numbers of Bytes per image: 512, 1024, 2048, 4096, 8192 and 16384. Each operating point indicates the total bitrate used to represent all the local features and their location information extracted from an image. This means that, according to the bitrate, only a limited number of local features can be encoded. This number is spanning between 114 local features at the lowest operating point of 512 Bytes to 970 local features at the highest operating point of 16384 Bytes.

The standardization process has currently reached the Core Experiments phase realizing a reference implementation on top of a Reference Model (RM).

The RM location information compression method as described by Tsai et al. in "Location Coding for Mobile Image Retrieval" at Mobimedia 2009 and as defined by the standardization in "Test Model of Compact Descriptor for Visual Search (MPEG doc w13145) in October 2012" works as described in the following. In the first step, the key point coordinates, originally computed in floating points values, are downscaled to certain resolution, e.g. VGA in the standard, and rounded to integer values in the new resolution. After this step, the location information can be represented as a very sparse matrix, as can be seen from FIG. 8. In the second step, a spatial grid with pre-defined block size is superimposed to the matrix and histograms of occurrences of non-null values into each block are computed as can be seen from FIG. 8. From this representation, two different kinds of information are encoded. The first one is a Histogram map which represents binary information about the presence or non-presence of key points in each block. A second one is a Histogram count that represents a number of occurrences in each non-null block.

The key point coordinates are represented in floating points values in the original non-scaled image resolution. Since the first operation applied to every image is the downscale to VGA resolution, the key point coordinates are rounded to integer values in VGA resolution. Therefore, it might happen that several points are rounded to the same coordinates. It is also possible to have two descriptors computed exactly on the same key point with two different orientations. This first rounding has negligible impact on the retrieval performances.

FIG. 8 depicts an example of such a rounding operation, where each square block 803, corresponds to a 1×1 pixel cell at full resolution. An image 800 can be created, where non-null pixels correspond to the position of the key points, and then partitioned into a block representation 801 which can be represented by a matrix representation 802. Values of these square blocks 803, 805, e.g. 2 for the first square block 803 and 1 for the second square block 805 as depicted in FIG. 8, are represented in a matrix 802, where non-null elements 807, 809 represent key points' position, e.g. a first non-null element 807 corresponding to the first block 803 and a second non-null element 809 corresponding to the second block cell 805. Consequently, the problem can be reformulated as the need to compress a matrix 802 of 640×480 elements, with the characteristic of being extremely sparse, i.e. having less than 1000 non-null cells, even at the highest operating point. For compressing this matrix, there is the need to represent two different kinds of information, which are a histogram map (hereby also referred as map of location information), that is, a binary map of empty and non-empty cells, and a histogram count, a vector containing the number of occurrences in each non-null cell. The histogram map is represented by the binary format of the block representation 801 depicted in FIG. 8 and the histogram count is represented by the vector created by the non-null elements of matrix representation 802 depicted in FIG. 8. For improving compression efficiency, in literature, these two elements are always encoded separately.

The Histogram count, in the RM, is encoded through plain single model arithmetic coding. The Histogram map adopts the so called sum-based arithmetic coding: each element is encoded through a context based arithmetic coding, the context being given by the number of non-null elements occurring in spatial proximity of the element to be encoded. Normally, rectangular regions are adopted to compute the context. This approach aims at exploiting the tendency of the local features to concentrate in certain regions. The context changes according to the block size because this causes different features concentration and according to the bitrate because different number of features is encoded for different bitrates. As a context-based arithmetic coding, the sum-based context requires training on specific training datasets.

The described prior art has two problems, namely memory allocation and need for training.

With respect to memory allocation, CDVS standardization addressed very memory constrained environments, i.e. should be implementable using memory tables of a memory size of smaller than 128 KB, in order to improve, for example, the hardware implementation on mobile devices.

In the RM, the size of the rectangle for sum-based context is 55 elements, i.e. 5 by 11. Therefore, the context used by the sum-based arithmetic coding can assume 56 values, i.e. values from 0 to 55. Besides, the RM model adopts a circular scanning of the histogram map elements, starting from the center and going to the sides of the matrix. Therefore, the central region where a rectangle of 55 elements has not been encoded already is encoded without context, just adopting single model arithmetic context. This probability value needs also to be signaled with a total of 57 elements to be signaled to optimally encode the histogram map at a certain block size and bitrate. The combination of block size and bitrate will be referred as testing point hereinafter. Considering that each context value is stored using 4 bytes and for each testing point, i.e. bitrate at a certain block size, 57 (context dimension)*4 (bytes per context value)*2 (0 and 1 probabilities) bytes are allocated, this results in a potential significant amount of memory required.

With respect to the need for training, in the method adopted by the RM, each testing point, i.e. bitrate at a certain block size, needs to be trained. Unless the full context for each testing point is stored on specific tables, thus resulting in large tables, the encoder and the corresponding decoder need to be trained on the same training dataset to provide exactly the same results thereby representing a problem for guaranteeing interoperability between encoders and decoders of different manufacturers or service providers.

SUMMARY OF THE INVENTION

It is the object of the invention to provide an improved technique for compressing the location information of local features extracted from an image.

This object is achieved by the features of the independent claims. Further implementation forms are apparent from the dependent claims, the description and the figures.

The invention is based on the finding that by approximating the standard sum-based context of an image by a double approximation, the above mentioned drawbacks can be solved. According to a first approximation, only three values (out of 57 for example) are stored for each testing point. Furthermore, by fixing the block size, only the values of one bitrate are stored, while the others are derived by a second approximation.

In order to describe the invention in detail, the following terms, abbreviations and notations will be used:

VS: Visual Search. VS is referred to as the capability of an automated system to identify an object or objects depicted in a image or in a sequence of images by only analyzing the visual aspects of the image or the sequence of images, without exploiting any external data, such as textual description, metadata, etc.

AR: Augmented Reality. AR can be considered as an advanced usage of VS, in particular applied to the mobile domain. After the objects depicted in a sequence of frames have been identified, additional content, normally synthetic objects, is superimposed to the real scene, thus 'augmenting' the real content.

SIFT: Scale-Invariant Feature Transforms.

SURF: Speeded Up Robust Features.

MPEG-7: Moving Pictures Expert Group No. 7 defines the multimedia content description interface, part 13 according to ISO/IEC 15938, dedicated to the development of a standard for Visual Search.

CDVS: Compact Descriptors for Visual Search.

bitrate: specified operating points of predetermined bytes per image as defined by the CDVS standardization.

RM: Reference Model.

VGA: Video Graphics Array (resolution 640×480), also referred to as full resolution.

local feature: a local feature is a compact description of a patch surrounding a key point in an image, invariant to rotation, illumination, and perspective distortions.

descriptor: local feature.

key point: In an image, the points upon which descriptors are computed normally relate to peculiar elements of the scene, e.g. corners, specific patterns, etc. Such points are normally called key points, points of interest or interest points.

context: set of values to which probability values for the different symbols used in the arithmetic coding phase are associated.

context curve: geometrical curve describing the variation of probability values used for the arithmetic coding phase, according to the possible context values, compressed context representation: the original information used to build up an approximation of the context for a certain block size and a certain encoding size.

context information values: information used to approximate the compressed context representation information for all the bitrates for a given block size.

According to a first aspect, the invention relates to a method for context based encoding of a histogram map of an image, the histogram map representing location information of key points of the image, the method comprising: providing or obtaining compressed context representation information associated to a given encoding size and to a given block size of a spatial grid applied to a matrix representation of the image to obtain the histogram map; computing, from the compressed context representation information, a context for the given encoding size and the given block size by applying an approximation algorithm; and encoding the histogram map using the context computed for the given encoding size and the given block size. The approximation algorithm can also be referred to as context computation algorithm.

By using such compressed context representation information the size (e.g. in bytes) needed for storing or transmitting the context, the context values and the corresponding probabilities can be reduced. Methods according to the first aspect make use of the finding that the context curves describing the real probabilities corresponding to the different context values of the context, typically obtained by training using training data, can be well approximated.

Further, interoperability is improved as the encoder does not need to be trained on the same training data set as a decoder for decoding the encoded histogram map information. The encoder is interoperable to the decoder.

In a first implementation form according to the first aspect, the compressed context representation information associated to the given encoding size and to the given block size comprises: a context value of the context and a probability value associated to the context value; and a further information allowing to compute the probability value associated to at least one other context value of the context.

In a second implementation form according to the first aspect as such or according to the first implementation form, the further information allowing to compute the probability of at least one other context value of the context comprises: a slope information; or a further context value and a further probability value associated to the further context value.

In a third implementation form according to the first or second implementation form, the compressed context representation information associated to the given encoding size and to the given block size further comprises: another context value and another probability associated to the another context value for context based encoding of a central element of the histogram map associated to a central block of the spatial grid through single model arithmetic coding.

In a fourth implementation form according to the first aspect as such or according to any of the preceding implementation forms, the given encoding size and the given block size are selected from sets of encoding sizes and block sizes.

In a fifth implementation form according to the first aspect as such or according to any of the preceding implementation forms, the set of the encoding sizes comprises at least one, several or all of the following values: 512, 1024, 2048, 4096, 8192 and 16384 Bytes.

In a sixth implementation form according to the first aspect as such or according to any of the preceding implementation forms, the compressed context representation information is provided for each combination of a given encoding size and a given block size from the sets of encoding sizes and block sizes, wherein providing may comprise, for example, storing and retrieving from a memory, e.g. from a look-up table, or receiving via a receiver from another device.

In a seventh implementation form according to the first aspect as such or according to any of the preceding implementation forms, the step of obtaining compressed context representation information comprises: computing the compressed context representation information for the given encoding size and the given block size from a set of context information values associated to the given block size by using a further approximation algorithm. The further approximation algorithm may also be referred to as compressed context computation algorithm.

By using such double approximation, i.e. first approximation (compressed context computation algorithm) and second approximation (context computation algorithm), the usage of context tables can be further reduced. When applying the second approximation, the approximated context can be stored by using very few values (e.g. 3). When the block size is fixed, only the values of one bitrate have to be stored, while the values for others can be derived by the first approximation.

In an eighth implementation form according to seventh implementation form, the set of context information values associated to the given block size comprises: a compressed context representation value of a context for a given encoding size; and a further information allowing to compute the compressed context representation value of the context for a further encoding size.

In a ninth implementation form according to eighth implementation form, the further information allowing to compute the compressed context representation value of the context for a further encoding size comprises: a slope information; or a further compressed context representation value for another encoding size.

In a tenth implementation form according to eighth or ninth implementation form, the given encoding size is the smallest encoding size of the set of encoding sizes.

The minimum encoding size can be used to approximate all of the compressed context representation values for all encoding sizes of the image at a certain block size.

In a eleventh implementation form according to any of the eighth to tenth implementation form, the given encoding size and the given block size are selected from sets of encoding sizes and block sizes, and wherein the set of context information values is provided for each block size from the set of block sizes; wherein providing may comprise, for example, storing and retrieving from a memory, e.g. from a look-up table, or receiving via a receiver from another device.

In a twelfth implementation form according to the first aspect as such or any of the preceding implementation forms, the context based encoding is a sum-based arithmetic coding and the histogram map is a binary matrix representation indicating the existence or non-existence of key points in a corresponding block of the spatial grid.

According to a second aspect, the invention provides a computer program with a program code for performing the method according to the first aspect or any of the implementation forms of the first aspect when run on a computer. The computer program may be stored on a memory, e.g. a ROM (Read Only Memory), a RAM (Random Access Memory), a Flash memory, a CD (Compact Disc), a DVD (Digital Video Disc), a blu-ray disc, or any other storage medium. The computer program may also be provided by download, streaming or in any other manner.

According to a third aspect, the invention provides a processor adapted to perform the encoding according to the first aspect or any of the implementation forms of the first aspect.

According to a fourth aspect, the invention provides an apparatus for context based encoding of a histogram map of an image, the histogram map representing location information of key points of the image, the apparatus comprising: a providing unit adapted to provide compressed context representation information associated to a given encoding size and to a given block size of a spatial grid applied to a matrix representation of the image to obtain the histogram map; a computing unit adapted to compute, from the compressed context representation information, a context for the given encoding size and the given block size by applying an approximation algorithm; and an encoding unit adapted to encode the histogram map using the context computed for the given encoding size and the given block size.

According to an implementation form of the fourth aspect, the obtaining unit is further adapted to compute the compressed context representation information for the given encoding size and the given block size from a set of context information values associated to the given block size by using a further approximation algorithm.

For the fourth aspect, the same considerations apply as for the first aspect.

In implementation forms of any of the aspects, the encoding size may refer to a target size, e.g. in bytes, of the overall feature information extracted from an image related to key points after encoding, or to any other target size of parts of such feature information after encoding.

In a further implementation form according to MPEG-7 (ISO/IEC 15938-Multimedia content description interface), part 13, Compact Descriptors for Visual Search (CDVS), the encoding size may correspond to the image descriptor length, wherein the image descriptor length is the size of the bitstream (image descriptor and related header) extracted from one image and used in the context of visual search, and wherein the term image descriptor refers to information (global descriptor and collection of local feature descriptors and or including histogram count and histogram map) extracted from one image used in the context of visual search.

According to a fifth aspect, the invention relates to a method for processing an image, the method comprising: providing a set of key points from the image; describing location information of a set of key points of the image in form of a binary matrix; computing an approximated context at a determined block size and bitrate through double approximation of the context and encoding the binary matrix through an arithmetic context where the context is given by a number of non-null matrix elements in spatial proximity to an element of the binary matrix.

In a first possible implementation form of the method according to the third aspect, the approximated context is determined through the following two compressed context representation values: a fixed point and a slope of a line passing through that fixed point.

In a second possible implementation form of the method according to the first implementation form of the third aspect, each of the two compressed context representation values of the context is derived through other two values which are: a further fixed point indicating the compressed context representation values at certain bitrate for each block size; and a further slope of a line used to approximate the compressed context representation values from the other bitrates.

In a third possible implementation form of the method according to the first implementation form of the third aspect, a single model probability of a central area is signaled separately.

In a fourth possible implementation form of the method according to the third implementation form of the third aspect, the single model probability of the central area is derived through other two values which are: a further fixed point indicating the single model probability at a certain bitrate for each block size; and a further slope of the line used to approximate the single model probability from the other bitrates.

The methods, systems and devices described herein may be implemented as software in a Digital Signal Processor (DSP), in a micro-controller or in any other side-processor or as hardware circuit within an application specific integrated circuit (ASIC).

The invention can be implemented in digital electronic circuitry, or in computer hardware, firmware, software, or in combinations thereof, e.g. in available hardware of conventional mobile devices or in new hardware dedicated for processing the methods described herein.

BRIEF DESCRIPTION OF THE DRAWINGS

Further embodiments of the invention will be described with respect to the following figures, in which.

DETAILED DESCRIPTION OF EMBODIMENTS OF THE INVENTION

Figure 1:
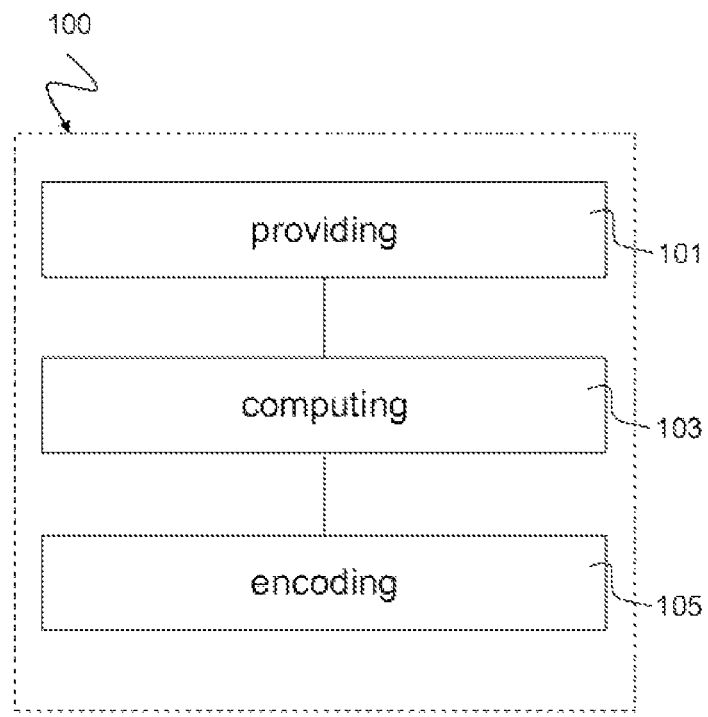
FIG. 1 shows a schematic diagram of a method for context based encoding of a histogram map of an image according to an implementation form.

FIG. 1 shows a schematic diagram of a method 100 for context based encoding of a histogram map of an image. The method comprises the following. Providing 101 compressed context representation information, e.g. A, B and C as explained later based on FIG. 2, associated to a given encoding size and to a given block size of a spatial grid applied to a matrix representation of the image to obtain the histogram map. Computing 103, from the compressed context representation information, a context for the given encoding size and the given block size by applying an approximation algorithm; and encoding 105 the histogram map using the context computed for the given encoding size and the given block size.

In the following, double approximation implementations will be described, wherein the term "bitrate" is used instead of "encoding size", the term "map of location information" instead of "histogram map" and a specific combination of a given encoding size and a given block size is referred to as "test point".

FIG. 1 shows a schematic diagram of a method 100 for encoding a map of location information determined from coordinates of a set of key points of an image according to an implementation form.

A set of test points, also denoted as testing points, is determined by a bit rate of the image and by a block size of a spatial grid applied to the map of location information.

The method 100 comprises providing 101 for each test point a compressed context representation information by applying a first approximation to a set of context information values predetermined from a set of testing images. The method 100 comprises computing 103, from the compressed context representation information, an approximated context for a test point by applying a second approximation with respect to the context adopted to encode elements of the map of location information belonging to the test point. The method 100 comprises encoding 105 the map of location information by using the approximated contexts of the test points.

In an implementation form of the method 100, the computing 103 of the context for a test point comprises at least one of the following steps: determining a first parameter by selecting one of the values for the context of the map of location information belonging to the test point; and determining a second parameter as a slope of a line approximating the context adopted to encode the elements of the map of location information belonging to the test point.

In an implementation form, the method 100 comprises utilizing further parameters to determine specific elements of the context adopted to encode the elements of the map of location information belonging to the test point. In an implementation form of the method 100, a third parameter is determined by applying single model arithmetic coding for encoding a central area of the elements of the map of location information. In an implementation form of the method 100, wherein the providing 101 a compressed context representation information for a test point comprises determining for at least one of the values a first context information value indicating the compressed context representation information value with respect to a reference bit rate of the image and a second context information value indicating a slope to linearly approximate the compressed context representation information value with respect to the bit rate of the image. In an implementation form of the method 100, the reference bit rate of the image is a minimum bit rate provided for the image. In an implementation form of the method 100, the determining the second context information value comprises determining the value by linear regression passing through the value determined at a maximum bit rate provided for the set of test points. In an implementation form, the method 100 comprises providing a context table comprising for the block size adopted by a test point of the map of location information the first context information value and the second context information value of at least one value of the corresponding compressed context representation information. In an implementation form of the method 100, the context table provides for a block size of the image, in particular a block size ranging from 1 to 12, the first and second context information value of a first compressed context representation information value, the first and second context information value of a second compressed context representation information value and a first and second context information value of a third compressed context representation information value. In an implementation form of the method 100, the bit rate of the image comprises one of the following values: 512, 1024, 2048, 4096, 8192 and 16384 Bytes per image. In an implementation form, the method 100 comprises providing the map of location information as a binary matrix. In an implementation form of the method 100, the map of location information is encoded by sum-based arithmetic coding adopting the context information of the test points.

Figure 2:
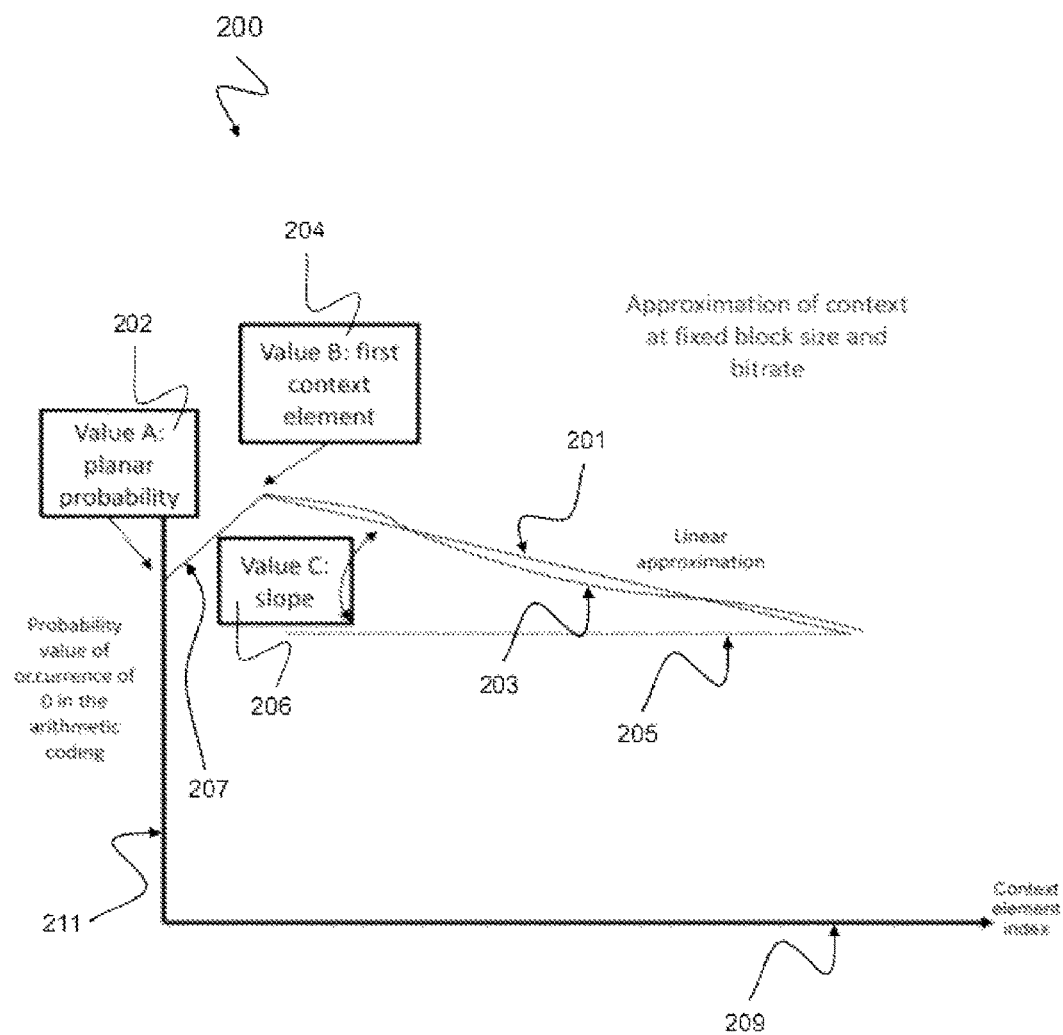
FIG. 2 shows a schematic diagram of an approximation of a context curve with three compressed context representation information values for a given encoding size and a given block size according to an implementation form.

FIG. 2 shows a schematic diagram 200 of an approximation of a sum-based context with three values 202, 204, 206 for a test point according to an implementation form. The diagram 200 illustrates a context curve 203 for a testing point which context curve 203 is approximated by a line 201. The context is approximated at a fixed block size and bitrate of the image. The context curve 203 is represented as probability value of occurrence of symbol 0 in the arithmetic coding 211 versus context element index 209.

By analysing the context curve 203 for each testing point determined by or associated to the block size and the bitrate of the image, it is possible to notice that, for arithmetic coding, the cumulative probability function of all the possible occurrences normally needs to be represented; however, since the location information map is encoded as a binary map, it is sufficient to represent only two values. By normalizing the cumulative probability at one it is sufficient to only store the probability of occurrence of zeros 211.

The context curve 203 is represented by the probability of occurrence of a zero 211 subject to the context number 209 besides the element related to a context value applied to a single model arithmetic coding used to encode a central area of the image that will be represented hereinafter as the first element of the context and is treated separately. The other values are approximated linearly 201. However, any other approximating function or algorithm can be adopted.

Thanks to this adopted approximation which is hereinafter referred to as "approximation A", each context curve 203 at a specific testing point is approximated through three coefficients as can be seen from FIG. 2. The first one 204 is a fixed point hereinafter referred to as value B. The second one 206 is the slope of the approximating line computed through linear regression, or any other approximation method hereinafter referred to as value C and the third coefficient 202 indicates a probability of zeros for the area adopting single model arithmetic coding hereinafter referred to as value A. Value A is treated separately.

The compressed context representation information values A, B and C vary according to the adopted test point which is determined by the block size and the bitrate of the image. Based on the assumptions that value A tends to be inversely proportional to the bitrate; value B tends to be inversely proportional to the bitrate and value C tends to be inversely proportional to the bitrate, for each block size, the values A, B, C are approximated through another approximation, which is hereinafter referred to as "approximation B" which is linear in an implementation form. In an alternative implementation form, approximation B applies any other approximating function. Therefore, at a certain block size, the values of A, B and C for all bitrates are approximated by using the two following values: One fixed value, for example the interpolated value at lowest bitrate; and the slope of the approximating line computed through linear regression, to derive all the other elements.

The linear regression is computed in a way to pass through the exact point at the highest bitrate, because this is the bitrate where the context is more beneficial. Using the described approximations a table with an exemplary number of 72 (e.g. 6 rows and 12 columns) elements is created by e.g. storing the context information values at different block sizes. In alternative implementation forms, another number of elements is created. Table 1 shows an exemplary representation of the context table.

value at lowest bitrate, and the slope value to derive the other values. Four values are stored for the sum-based area, which are value B for a specific bitrate, e.g. the interpolated value at lowest bitrate, and the slope value to derive the other values, value C for a specific bitrate, e.g. the interpolated value at lowest bitrate, and the slope value to derive the other values.

Figure 3:
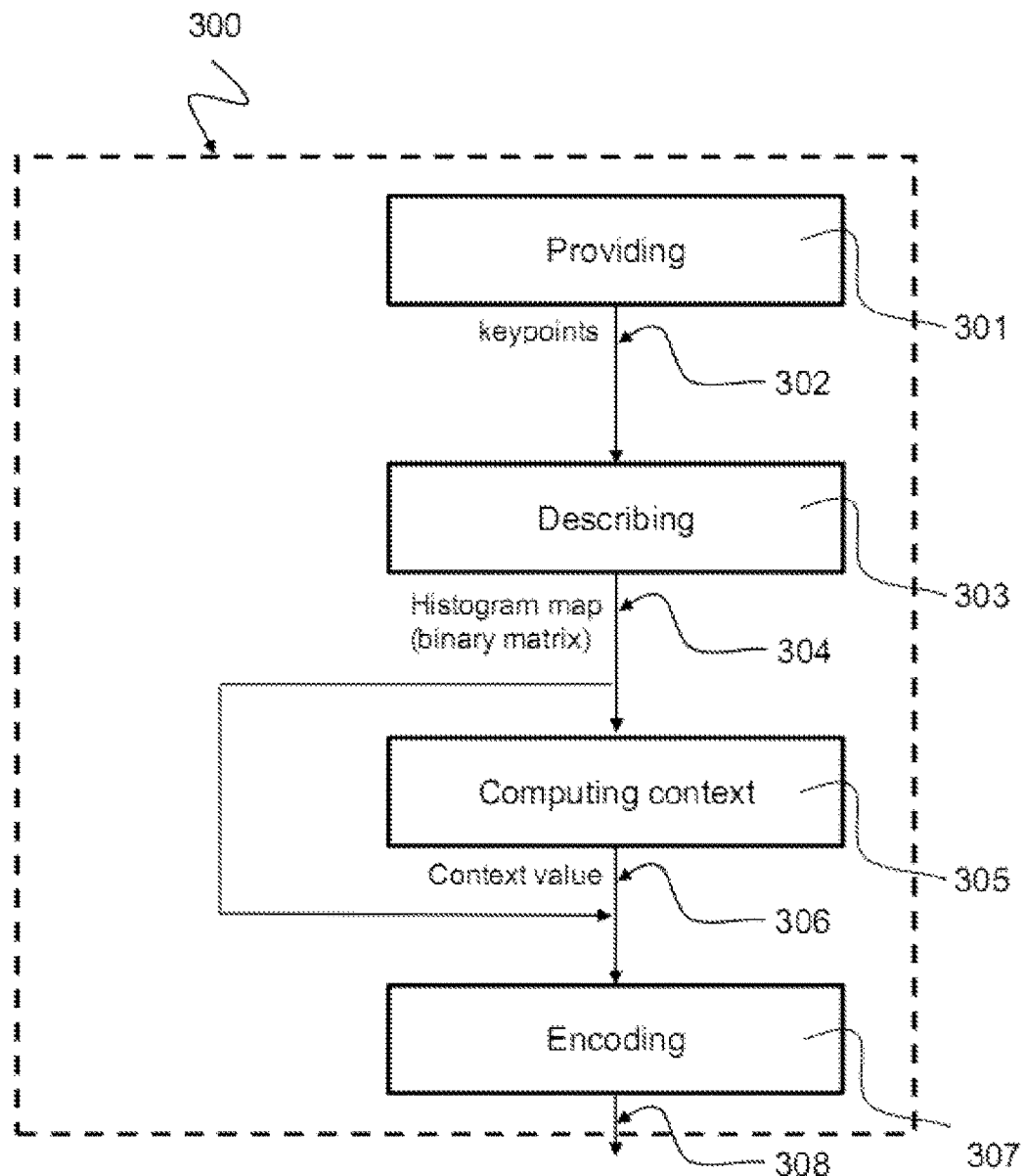
FIG. 3 shows a block diagram of an encoder for context based encoding of a histogram map of an image according to an implementation form.

FIG. 3 shows a block diagram of an encoder 300 for encoding a map of location information according to an implementation form. The encoder 300 comprises four processing means also called processing blocks. In an implementation form, the processing means are implemented by hardware units, for example application specific integrated circuits (ASIC). In an implementation form, the processing means are implemented by software, for example by a program running on a digital signal processor (DSP) or a microcontroller.

Processing block 301 is configured to compute a set of key points from the image. Processing block 303 is configured to describe location information of the set of key points in form of a binary matrix and to generate the histogram map. Processing block 305 is configured to compute the approximated context for the block size and bitrate of interest, i.e. the current testing point, though double approximation, e.g. by the method 100 as described with respect to FIG. 1 and/or by using the approximation as described with respect to FIG. 2. Processing block 307 is configured to encode the binary matrix through sum-based arithmetic coding adopting the approximated context computed at block 305.

TABLE 1

Exemplary representation of the context table

| Block 1 context | Block 2 context | Block 3 context | Block 4 context | Block 5 context |
|---|---|---|---|---|
| value A at lowest bitrate (block size 1) | value A at lowest bitrate (block size 2) | value A at lowest bitrate (block size 3) | value A at lowest bitrate (block size 4) | value A at lowest bitrate (block size 5) |
| Slope to compute values A at other bitrates (block size 1) | Slope to compute values A at other bitrates (block size 2) | Slope to compute values A at other bitrates (block size 3) | Slope to compute values A at other bitrates (block size 4) | Slope to compute values A at other bitrates (block size 5) |
| value B at lowest bitrate (block size 1) | value B at lowest bitrate (block size 2) | value B at lowest bitrate (block size 3) | value B at lowest bitrate (block size 4) | value B at lowest bitrate (block size 5) |
| Slope to compute values B at other bitrates (block size 1) | Slope to compute values B at other bitrates (block size 2) | Slope to compute values B at other bitrates (block size 3) | Slope to compute values B at other bitrates (block size 4) | Slope to compute values B at other bitrates (block size 5) |
| value C at lowest bitrate (block size 1) | value C at lowest bitrate (block size 2) | value C at lowest bitrate (block size 3) | value C at lowest bitrate (block size 4) | value C at lowest bitrate (block size 5) |
| Slope to compute values C at other bitrates (block size 1) | Slope to compute values C at other bitrates (block size 2) | Slope to compute values C at other bitrates (block size 3) | Slope to compute values C at other bitrates (block size 4) | Slope to compute values C at other bitrates (block size 5) |

The context table as depicted in table 1 stores the entire context information values, where each column stores all the information needed to recreate the approximated context at any bitrate for a certain block size. In an implementation form reasonable for visual search and augmented reality applications, the block size varies from 1 to 12. In an implementation form, for each block size 6 values are stored. For each block size, two values are stored for approximating the area with single mode arithmetic coding which are value A for a specific bitrate, e.g. the interpolated In an implementation form, the block diagram of FIG. 3 represents a method 300 for encoding a map of location information. The method 300 comprises the steps of computing 301 a set of key points from the image; describing 303 location information of the set of key points in form of a binary matrix and generating the histogram map; computing 305 the approximated context for the block size and bitrate of interest, i.e. the current testing point, through double approximation, e.g. by the method 100 as described with respect to FIG. 1 and/or by using the approximation as described with respect to FIG. 2; and encoding 307 the binary matrix through sum-based arithmetic coding adopting the approximated context computed at step 305.

In an implementation form, the computing context 305 corresponds to the providing 101 and computing 103 as described above with respect to FIG. 1 and the encoding 307 corresponds to the encoding 105 as described above with respect to FIG. 1.

In an implementation form, the histogram map 304 corresponds to the map of location information as described above with respect to FIG. 1. In an implementation form, the context value 306 corresponds to the approximated context as described above with respect to FIG. 1.

Figure 4:
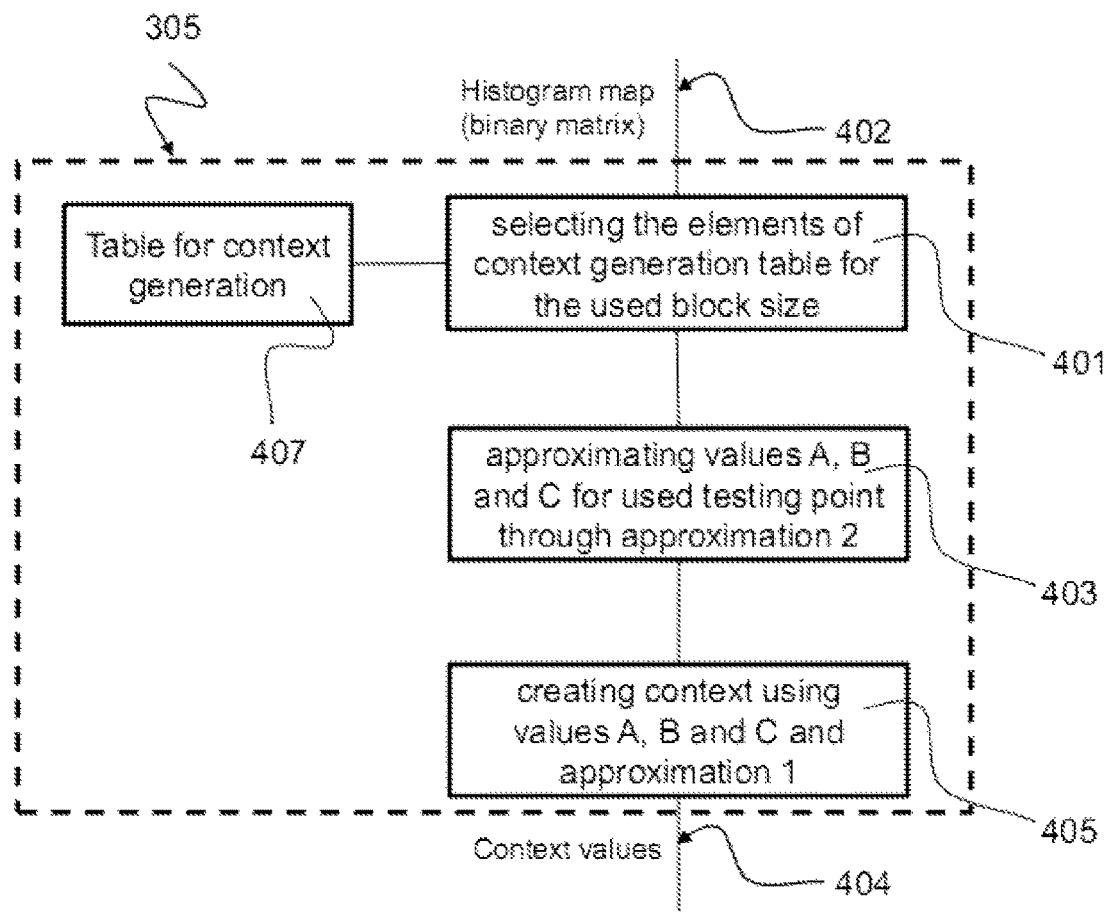
FIG. 4 shows a block diagram of the computing context block 305 depicted in FIG. 3 according to an implementation form.

FIG. 4 shows a block diagram of the computing context block 305 depicted in FIG. 3 according to an implementation form. The process of deriving the approximated context used by block 307 for the sum-based arithmetic coding is depicted in detail. The computing context block 305 comprises four processing blocks. Processing block 401 is configured to select the elements of the context table 407 related to the block size of interest. Processing block 403 is configured to use the elements selected at block 401 to approximate, through approximation B as described above with respect to FIG. 2, the values A, B and C for the bitrate of interest. Processing block 405 is configured to compute, starting from the elements computed at block 403, the approximated context for the testing key point using value A, and to compute a line passing through value B, with a slope as value C, to compute the other elements of the context according to approximation A as described above with respect to FIG. 2. Processing block 407 indicates the table for context generation computed through the process described below with respect to FIG. 5.

In an implementation form, the values A, B and C correspond to value A 202, value B 204 and value C 206, respectively, as described above with respect to FIG. 2.

In an implementation form, the block diagram of FIG. 4 represents a method for computing a context. The method comprises the steps of selecting 401 the elements of the context table 407 related to the block size of interest; using 403 the elements selected at block 401 to approximate, through approximation B, the values A, B and C for the bitrate of interest; computing 405 starting from the elements computed at block 403, the context for the testing key point using value A, and computing a line passing through value B, with a slope as value C, to compute the other elements of the context according to approximation A; and indicating 407 the table for context generation computed through the process described below with respect to FIG. 5.

Figure 5:
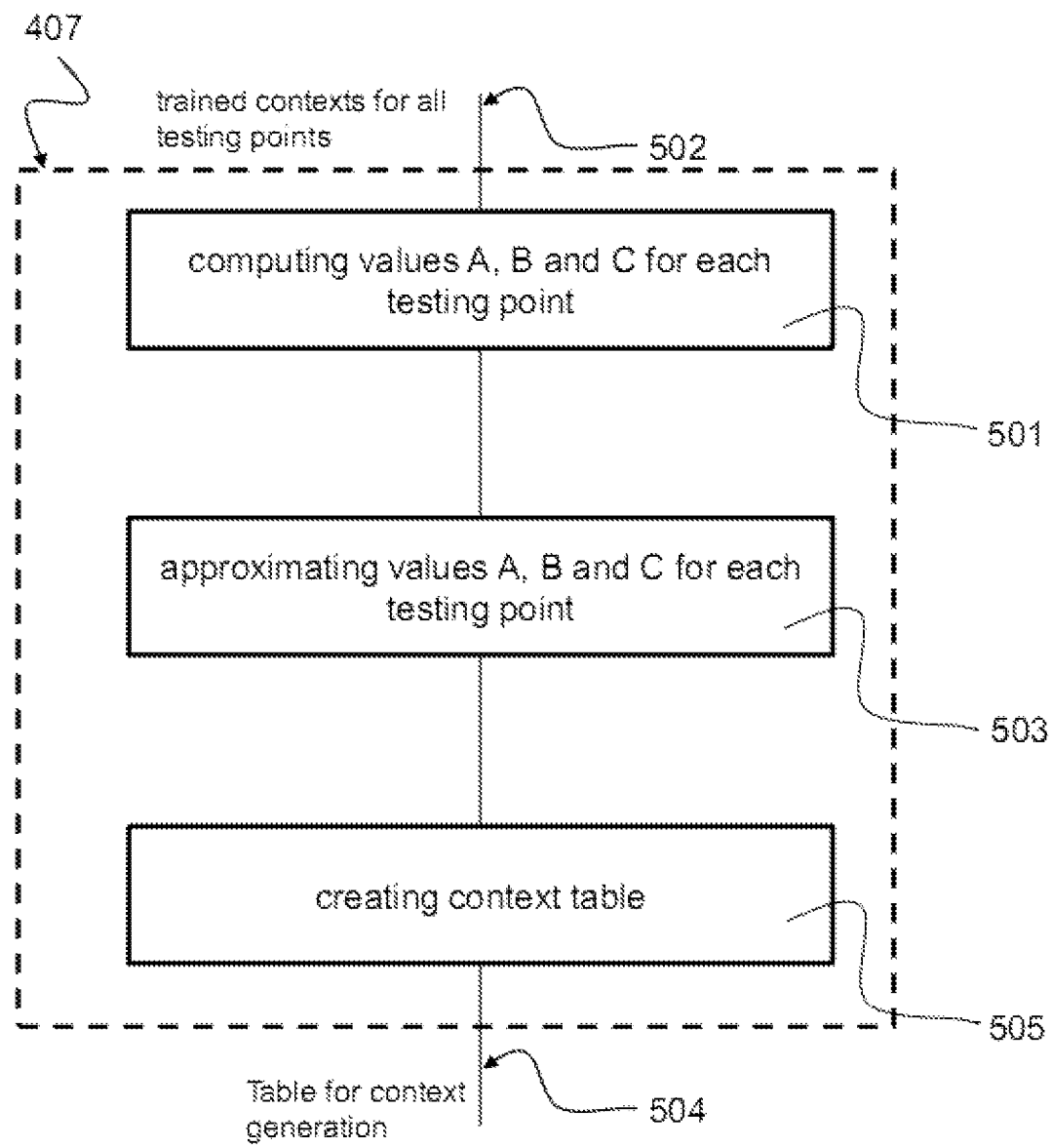
FIG. 5 shows a block diagram for creating the table for context generation block 407 depicted in FIG. 4 according to an implementation form.

FIG. 5 shows a block diagram of the table for context generation block 407 depicted in FIG. 4 according to an implementation form. The table 407 is generated offline, through the processing blocks depicted in FIG. 5. The table for context generation block 407 comprises three processing blocks. Processing block 501 is configured to compute values A, B and C for each testing point. Processing block 503 is configured to approximate values A, B and C for each block size, through linear regression. Processing block 505 is configured to generate the context table storing all the approximated values.

In an implementation form, the block diagram of FIG. 5 represents a method for generating the context generation block 407. The method comprises the steps of computing 501 values A, B and C for each testing point; approximating 503 values A, B and C for each block size, and generating 505 the context table storing all the approximated values.

Figure 6:
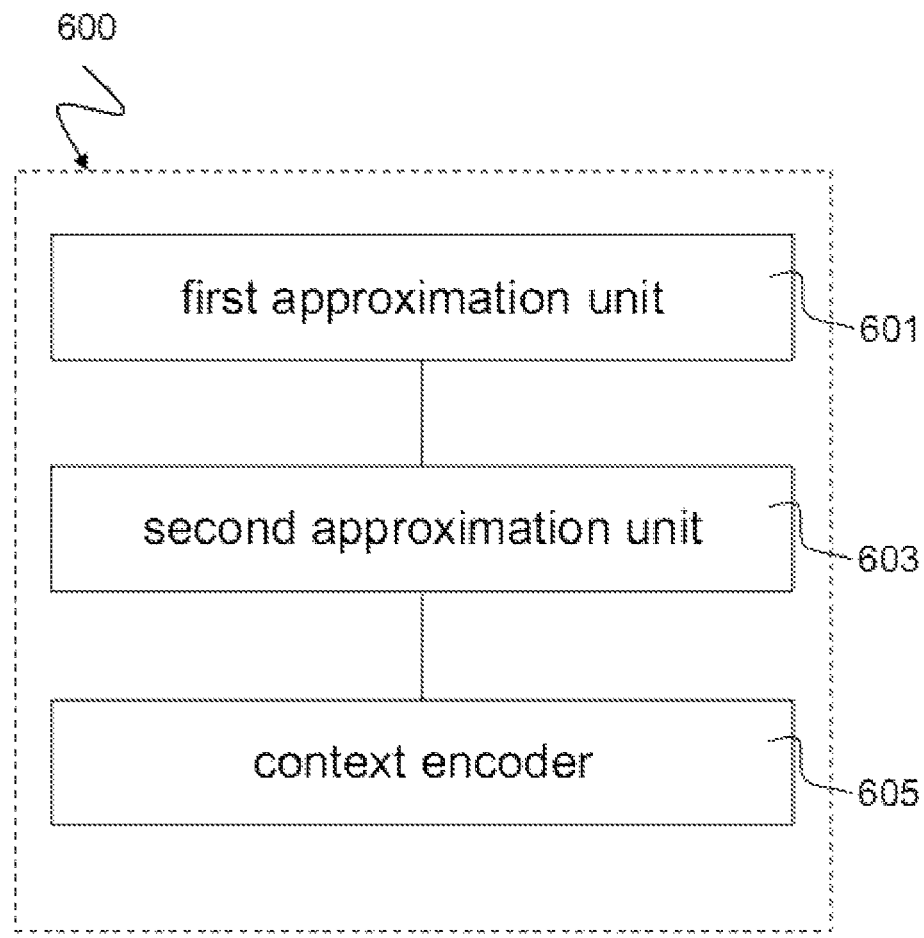
FIG. 6 shows a block diagram of an encoder for context based encoding of a histogram map of an image according to an implementation form.
Figure 7:
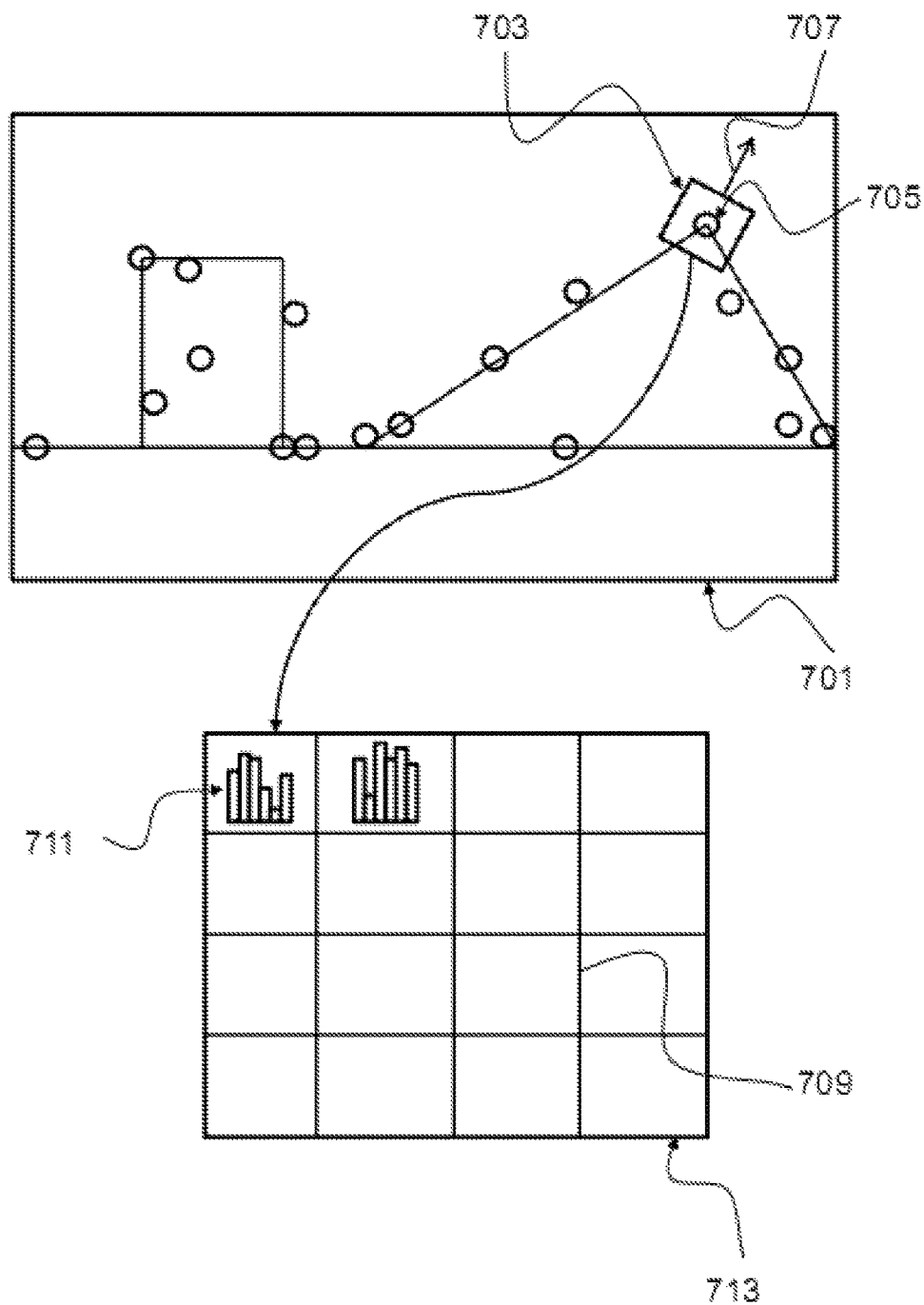
FIG. 7 shows a schematic diagram of an exemplary extraction and representation of local features according to a conventional method.
Figure 8:
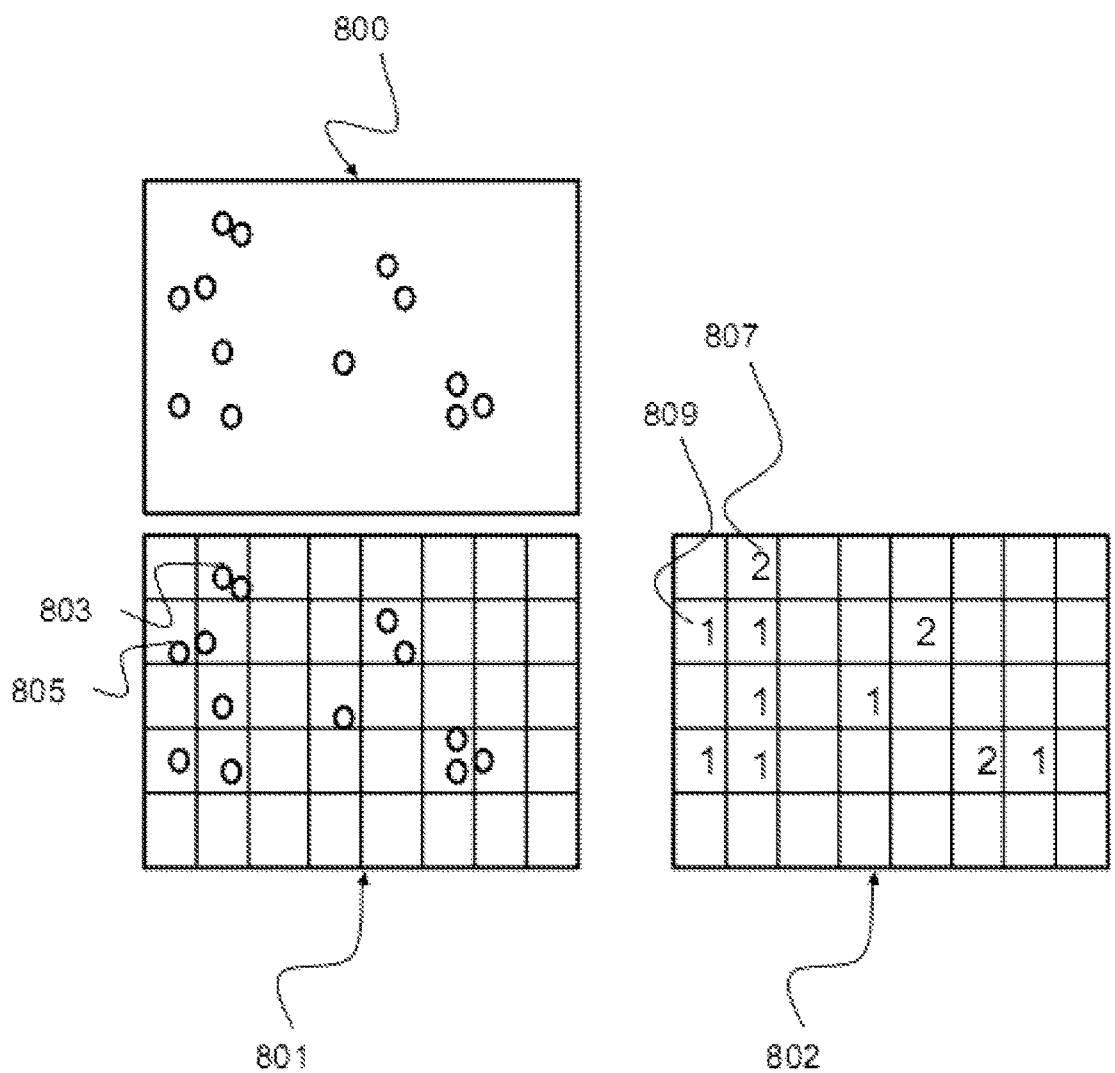
FIG. 8 shows a schematic diagram of histogram map and histogram count generation according to a conventional method.

FIG. 6 shows a block diagram of an encoder 600 for encoding a map of location information according to an implementation form. The map of location information is determined from coordinates of a set of key points of an image. A set of test points is determined by a bit rate of the image and by a block size of a spatial grid applied to the map of location information. The encoder 600 comprises a first approximation unit 601 which is configured for providing for a test point a compressed context representation information by applying a first approximation to a set of context information values predetermined from a set of testing images. The encoder 600 comprises a second approximation unit 603 which is configured for computing, from the compressed context representation information an approximated context for a test point by applying a second approximation with respect to the context adopted to encode the elements of the map of location information belonging to the test point. The encoder 600 further comprises a context encoder 605 configured for encoding the map of location information by using the approximated context of the test point.

In an implementation form of the encoder 600, the second approximation unit 603 comprises at least one of the following units: a first determining unit which is configured for determining a first compressed context representation information parameter by selecting one of the values for the context adopted to encode the elements of the map of location information belonging to the test point; a second determining unit which is configured for determining a second compressed context representation information parameter as a slope of an approximating line to compute the other elements of the context adopted to encode the elements of the map of location information belonging to the test point; and a third determining unit which is configured for determining a third compressed context representation information parameter to determine a specific element of the context adopted to encode the elements of the map of location information belonging to the test point. The first approximation unit 601 is configured for determining for at least one of the three compressed context representation information parameters a first context information value indicating the compressed context representation information parameter with respect to a reference bit rate for a certain block size of the image and a second context information value indicating a slope to approximate the compressed context representation information parameter with respect to the bit rate of the image.

In an implementation form, the encoder 600 is adapted to implement the method 100 as described above with respect to FIG. 1 or the methods as described above with respect to FIGS. 2 to 5.

Although, implementation forms using double approximation have been primarily described, implementation forms of the invention are not limited to such. As described based on FIG. 1 initially, implementation forms of the method, which can also be referred to as method 100 for context based encoding of a histogram map of an image, the histogram map representing location information of key points of the image, may also comprise the following.

Providing or obtaining 101 compressed context representation information, e.g. A; B; C, associated to a given encoding size and to a given block size of a spatial grid applied to a matrix representation of the image to obtain the histogram map.

Computing 103, from the compressed context representation information, e.g. A; B; C, a context 201 for the given encoding size and the given block size by applying an (content computation) approximation algorithm.

Encoding 105 the histogram map using the context computed for the given encoding size and the given block size.

Such implementations may—instead of deriving the compressed context representation information from a set of context information values—store or receive the compressed context representation information for one or a plurality of combinations of encoding size and block size.

The same applies for implementation forms of computer program products, processors and apparatus. These can be implemented using single or double approximation to obtain the context for a given encoding size and a given block size.

Therefore, an implementation of an apparatus for context based encoding of a histogram map of an image, the histogram map representing location information of key points of the image, comprises a providing unit, a computing unit and an encoding unit.

The providing unit is adapted to provide compressed context representation information associated to a given encoding size and to a given block size of a spatial grid applied to a matrix representation of the image to obtain the histogram map. The computing unit is adapted to compute, from the compressed context representation information, a context for the given encoding size and the given block size by applying an approximation algorithm. The encoding unit is adapted to encode the histogram map using the context computed for the given encoding size and the given block size.

Accordingly, in a further implementation form (double approximation implementation) of the apparatus, the obtaining unit is further adapted to compute the compressed context representation information for the given encoding size and the given block size from a set of context information values associated to the given block size by using a further approximation algorithm.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

What is claimed is:

1. A method for context based encoding of a histogram map of an image, the histogram map representing location information of key points of the image, the method comprising:
   providing compressed context representation information (A; B; C) associated with a given encoding size and to a given block size of a spatial grid applied to a matrix representation of the image to obtain the histogram map;
   determining, from the compressed context representation information (A; B; C), a context for the given encoding size and the given block size by applying an approximation algorithm; and
   encoding the histogram map using the context computed for the given encoding size and the given block size,
   wherein the compressed context representation (A; B; C) information is determined from a set of context information values associated with the given block size and another encoding size by using a further approximation algorithm.

2. The method of claim 1, wherein the compressed context representation information associated to the given encoding size and to the given block size comprises:
   a context value (B) of the context and a probability value associated to the context value; and
   further information allowing to compute the probability value associated to at least one other context value of the context.

3. The method of claim 2, wherein the further information allowing to compute the probability of at least one other context value of the context comprises:
   a slope information; or
   a further context value and a further probability value associated to the further context value.

4. The method of claim 2, wherein the compressed context representation information associated to the given encoding size and to the given block size further comprises:
   another context value (A) and another probability associated to the another context value for context based encoding of a central element of the histogram map associated to a central block of the spatial grid through single model arithmetic coding.

5. The method of claim 1, wherein the given encoding size and the given block size are selected from sets of encoding sizes and block sizes.

6. The method of claim 1, wherein the compressed context representation information (A; B; C) is provided for each combination of a given encoding size and a given block size from the sets of encoding sizes and block sizes.

7. The method of claim 1, wherein the set of context information values associated to the given block size comprises:
   a compressed context representation information value (A; B; C) of a context for a given encoding size; and
   a further information allowing to compute the compressed context representation information value of the context for a further encoding size.

8. The method of claim 7, wherein the further information allowing to compute the compressed context representation information value of the context for a further encoding size comprises:
   a slope information; or
   a further compressed context representation information value for another encoding size.

9. The method of claim 7, wherein the given encoding size is the smallest encoding size of the set of encoding sizes.

10. The method of claim 7, wherein the given encoding size and the given block size are selected from sets of encoding sizes and block sizes, and wherein the set of context information values is provided for each block size from the set of block sizes.

11. An apparatus for context based encoding of a histogram map of an image, the histogram map representing location information of key points of the image, the apparatus comprising:

an obtaining unit adapted to determine a compressed context representation information for a given encoding size and a given block size from a set of context information values associated with the given block size and another encoding size by using an approximation algorithm;

a providing unit adapted to provide compressed context representation information associated with a given encoding size and to a given block size of a spatial grid applied to a matrix representation of the image to obtain the histogram map;

a computing unit adapted to determine, from the compressed context representation information, a context for the given encoding size and the given block size by applying a further approximation algorithm; and an encoding unit adapted to encode the histogram map using the context computed for the given encoding size and the given block size.

* * * * *